US000001504H

United States Statutory Invention Registration [19]

[11] Reg. Number: H1504

Crabtree

[45] Published: Dec. 5, 1995

[54] ANTI-ARMOR WARHEAD ASSEMBLY

[75] Inventor: Larry E. Crabtree, Falmouth, Va.

[73] Assignee: The United States of America as represented by the Secretary of the Navy, Washington, D.C.

[21] Appl. No.: 394,079

[22] Filed: Feb. 21, 1995

[51] Int. Cl.[6] ..... F42B 12/10

[52] U.S. Cl. ..... 102/476

[58] Field of Search ..... 102/306–310, 102/476

[56] References Cited

U.S. PATENT DOCUMENTS

| | | | |
|---|---|---|---|
| H58 | 5/1986 | Smith et al. | 102/476 |
| 2,697,400 | 12/1954 | Liljegren | 102/476 |
| 2,866,414 | 12/1958 | Smith | 102/476 |
| 3,613,585 | 10/1971 | Dubroff | 102/476 |
| 3,662,684 | 5/1972 | Bodinaux | 102/476 |
| 4,703,695 | 11/1987 | Langer | 102/476 |
| 4,798,145 | 1/1989 | McVeagh | 102/476 |
| 4,938,146 | 7/1990 | Gunther et al. | 102/476 |
| 4,982,665 | 1/1991 | Sewell et al. | 102/476 |

FOREIGN PATENT DOCUMENTS

| | | | |
|---|---|---|---|
| 2555303 | 5/1985 | France | 102/476 |

*Primary Examiner*—Harold J. Tudor
*Attorney, Agent, or Firm*—James B. Bechtel

[57] ABSTRACT

An anti-armor warhead assembly includes an open-ended cylindrical warhead case defined by a first section, a second section and a third section. The first section has a constant inside diameter $D_1$. The second section has a constant inside diameter $D_2$ and connects the first section and the third section. The third section is defined by an inside diameter $D_3$. The relationship between the diameters is such that $D_1 < D_3 \leqq D_2$. A hollow conically shaped charge liner is axially aligned and fitted within the warhead case. Explosive material fills the first section of the warhead case about an outwardly facing surface of the charge liner. A retaining ring fitted on the third section retains the charge liner and the explosive material in the first section. An end cap fitted to the first section has an initiator coupler formed therein for housing a primer charge used to detonate the explosive material.

2 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ANTI-ARMOR WARHEAD ASSEMBLY

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to warhead assemblies, and more particularly to an anti-armor warhead assembly that can be loaded with either cast or pressed explosive material.

BACKGROUND OF THE INVENTION

Anti-armor projectiles are known in the art and include a variety of designs. Typically, the projectile's warhead assembly includes a shaped charge of explosive. The warhead assembly is generally designed to be loaded with an explosive material that is either cast directly in the warhead assembly or is a pressed, i.e., solid, explosive material that is fitted into the warhead assembly. However, it is desirable for a warhead assembly to be loadable with either a cast or pressed explosive material. In this way, the best explosive material for a particular application can be selected. Furthermore, as the U.S. military strives to cut costs via versatility in design, it is best to have a universal warhead assembly in terms of being loaded with either a cast or pressed explosive material.

SUMMARY OF THE INVENTION

Accordingly, it is an object of the present invention to provide an anti-armor assembly that can be loaded with either a cast or pressed explosive material.

Other objects and advantages of the present invention will become more obvious hereinafter in the specification and drawings.

In accordance with the present invention, an anti-armor warhead assembly includes an open-ended cylindrical warhead case for the structural support of the warhead assembly in flight. The warhead case defined by a first section, a second section and a third section. The first section has a constant inside diameter $D_1$. The second section has a constant inside diameter $D_2$ and connects the first section and the third section. The third section is defined by inwardly facing threads that present an inside diameter $D_3$. The relationship between the diameters is such that $D_1<D_3\leqq D_2$. A hollow conically shaped charge liner is axially aligned and fitted within the warhead case. The charge liner has a closed apex and an open base, and further defines an inwardly facing surface and an outwardly facing surface. Explosive material fills the first section of the warhead case about the outwardly facing surface of the charge liner. A retaining ring, threadably engaged with the inwardly facing threads of the third section, retains the charge liner and the explosive material in the first section. An end cap, fitted to the first section, has an initiator coupler formed therein for housing a primer charge used to detonate the explosive material. The initiator coupler is in axial alignment with the charge liner.

DETAILED DESCRIPTION OF THE INVENTION

Figure 1:
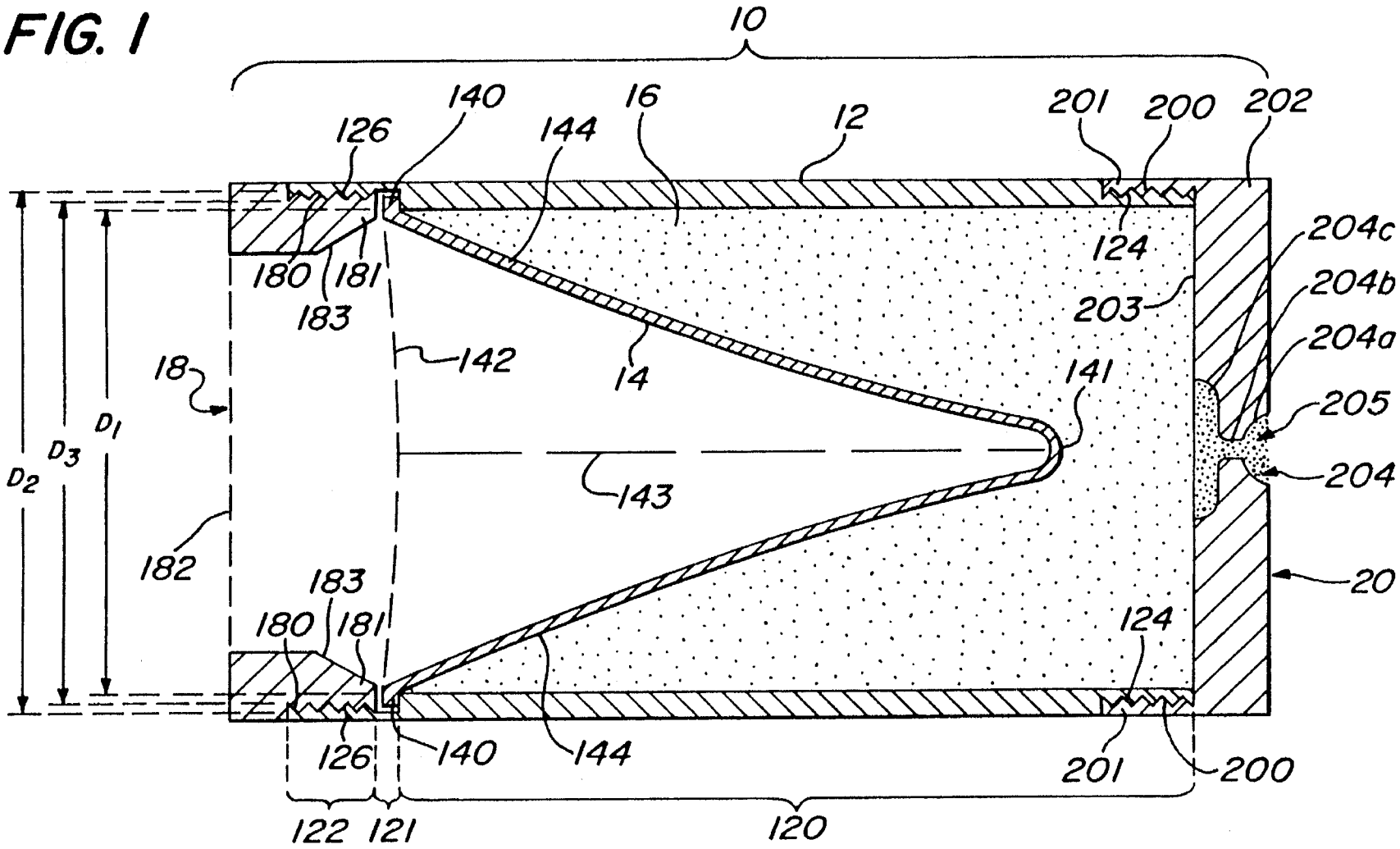
FIG. 1 is a side, cross-sectional view of the anti-armor warhead assembly according to the present invention.

Referring now to the drawings, and more particularly to FIG. 1, anti-armor warhead assembly 10 is shown in cross-section. Assembly 10 includes warhead case body 12, charge liner 14, explosive material 16, retaining ring 18 and end cap 20.

Warhead case body 12 forms the structural support for explosive material 16 and must be constructed to withstand both launch and in-flight forces experienced by assembly 10 in its particular application. Typically, warhead case body 12 is made from a high-strength steel, plastic or composite material.

In terms of the present invention, warhead case body 12 is a hollow cylindrical tube that is defined by sections 120, 121 and 122. Section 120 extends from one open end of warhead case body 12 (that mates with end cap 20) to section 121. Thus, section 122 extends from the other open end of warhead case body 12 (that mates with end cap 18) to section 121. Section 121 extends between sections 120 and 122.

Section 120 presents a constant inside diameter $D_1$ along its smooth interior surface. Threads 124 face outwardly from one end of section 120 for threaded engagement with inwardly facing threads 200 of end cap 20. Along section 122, threads 126 face inwardly and present an inside diameter $D_3$ that is slightly larger than inside diameter $D_1$ for reasons that will be discussed further below. Threads 126 engage with outwardly facing threads 180 on retaining ring 18. Section 121 is essentially an inwardly facing annular groove machined into warhead case body 12 for receiving annular lip 140 (if one is present) of charge liner 14 as will be explained further below. Section 121 presents an inside diameter $D_2$ that can be equal to or slightly greater than inside diameter $D_3$.

Charge liner 14 is a hollow, conically shaped material that distorts to form a (shaped charge assembly) jet a when explosive material 16 is detonated as is well understood by one skilled in the art of shaped charge assemblies. Choice of materials for charge liner 14 is dependent upon what the warhead is intended to defeat and can be metal, glass, ceramic or any other solid material that distorts to form a jet when explosive material 16 is detonated. For anti-armor purposes, copper or other high-density metals are usually selected for charge liner 14.

Charge liner 14 is defined by a closed apex 141 and an open base designated by dashed line 142. Charge liner 14, when fitted in warhead case body 12, has its central longitudinal axis 143 axially aligned within section 120 of warhead case body 12. Annular lip 140 at open base 142 fits in the annular groove formed by section 121 of warhead case body 12. As will be explained further below, annular lip 140 must be present if explosive material is to be cast in warhead case body 12 while annular lip 140 can be present if explosive material is a pressed explosive.

As is understood in the art, when explosive material 16 is detonated, a spherical shock wave propagates outward at high velocity from the point of initiation. As the shock wave collides with charge liner 14, the conical shape of charge liner 14 collapses such that closed apex 141 moves along central longitudinal axis 143 towards and through open base 142. In other words, closed apex 141 becomes the faster moving tip of a jet while open base 142 becomes the slower moving tail of the jet. The resulting jet exits assembly 10 through retaining ring 18.

Explosive material 16 is any cast or pressed explosive that, in most applications, is selected to be as insensitive as possible, i.e., remaining inert until detonation is initiated as planned. Commonly used cast explosive materials are U.S. military supply explosives PBXN-110, OCTOL and PBXC126. Commonly used pressed explosive materials are U.S. military supply explosives LX-14, PBXW-11 and PBXN-9. For all such explosive materials, explosive material 16 fills the entire warhead case body 12 between the inside walls of section 120 and outwardly facing surface 144 of charge liner 14.

Retaining ring 18 is a cylindrical ring having open end 181 and open end 182. Retaining ring 18 is typically made from the same material as that of warhead case body 12 since it will be subject to high G-loads upon launch of assembly 10. Outwardly facing threads 180 starting at open end 181 engage with threads 126 of section 122 of warhead case body 12. Open end 181 of retaining ring 18 comes to rest against annular lip 140 (if present), or within section 121 if charge liner 14 has no such annular lip, in order to retain charge liner 14 and explosive material 16 in place in section 120. Retaining ring 18 at open end 182 can be adapted to fit a particular projectile application as will be explained further below. So as not to interfere with the tail of the jet formed by charge liner 14 at detonation, inside surface 183 of retaining ring 18 tapers outward so that open end 181 is sized to match open base 142.

End cap 20, typically made from the same material as that of warhead case body 12, is a cylindrical end cap having cylindrical flange 201 extending from end cap housing 202. Inwardly facing threads 200 formed along cylindrical flange 201 engage with threads 124 of section 120. End cap housing 202 is machined to define initiator coupler 204 for holding primer charge 205 which detonates explosive material 16 at a time determined by the particular application. End cap housing 202 is flat along inner surface 203 thereof to be in flush contact with explosive material 16 to insure that primer charge 205 only contacts explosive material 16 where defined by initiator coupler 204. Further, end cap housing 202 can be adapted to fit a particular projectile application.

The design of initiator coupler 204 is typically a precision initiator coupler for causing detonation of explosive material in such a way that the resulting shock wave is symmetric about central longitudinal axis 143. In the preferred embodiment, initiator coupler 204 is divided into three sections, namely, initiating section 204*a*, concentrating column 204*b* and detonation section 204*c*, all of which are symmetric about central longitudinal axis 143. Briefly, initiating section 204*a* receives output from a fuzing device (not shown) to start an explosive reaction of primer charge 205. Concentrating column 204*b* transfers the initiated explosive reaction to detonation section 204*c* in a concentrated fashion. Detonation section 204*c* transfers the explosive reaction to explosive material 16.

To load assembly 10 with a castable-type explosive material, charge liner 14 having annular lip 140 is passed through sections 122 and 121 where it is fitted into warhead case body 12 so that annular lip 140 comes to rest in section 121. Retaining ring 18 is screwed into section 122 until that portion of retaining ring 18 at open end 181 seats against annular lip 140 thereby holding charge liner 14 in place. Explosive material 16 is poured into warhead case body 12 about outwardly facing surface 144 of charge liner 14. End cap 20 is screwed into section 120 so that inner surface 203 is flush with explosive material 16.

If explosive material 16 is of the pressed type, explosive material 16 is machined to its ultimate shape (i.e., its exterior diameter sized to fit into section 120 and its interior conical portion sized/shaped to mate with outwardly facing surface 144 of charge liner 14) prior to installation into warhead case body 12. The machined explosive material with charge liner 14 therein is positioned in warhead case body 12 through section 120. To facilitate such installation, charge liner 14 has no annular lip 140 since the inside diameter $D_1$ is less than the outside diameter presented by such annular lip. (Note that if charge liner 14 is installed via section 122 after explosive material has been positioned, annular lip 140 could still be present on charge liner 14. However, this may jeopardize the centering alignment of charge liner 14 in explosive material 16 since charge liner 14 would be positioned by means of retaining ring 18 cooperating with annular lip 140.) Retaining ring 18 and end cap 20 are then screwed onto warhead case body 12 as described above.

Figure 2:
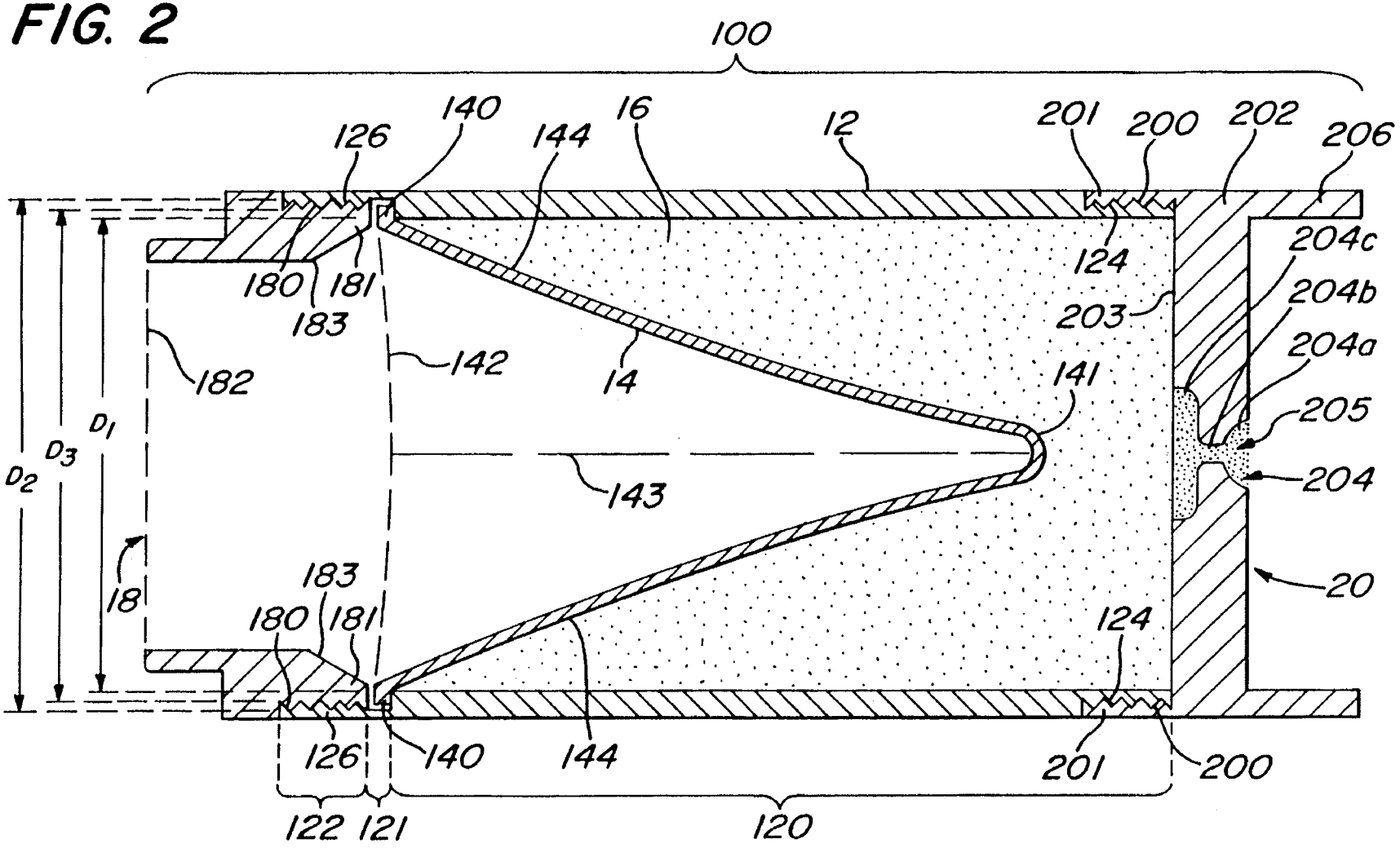
FIG. 2 is a side, cross-sectional view of the warhead assembly of the present invention with its end caps adapted for installation in the MERLIN anti-armor mortar projectile.

As noted above, retaining ring 18 and end cap 20 can easily be adapted to fit a particular projectile. For example, as shown in FIG. 2, anti-armor warhead assembly 100 is shown for use with the MERLIN terminally guided anti-armor mortar projectile produced by British Aerospace of Great Britain. The elements in common with warhead assembly 10 are shown with like reference numerals. End cap 20 includes rearwardly extending circumferential flange 206 forming an interference fit with the aft end of the existing MERLIN round (not shown). Retaining ring 18 has forwardly extending circumferential flange 184 for seating in the forward end of the existing MERLIN round (not shown).

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An anti-armor warhead assembly, comprising:

an open-ended cylindrical warhead case for structurally supporting said warhead assembly in flight, said warhead case defined by a first section, a second section and a third section, said first section having a constant inside diameter $D_1$, said second section having a constant inside diameter $D_2$, said second section further being between and connecting said first section and said third section, and said third section defined by inwardly facing threads presenting an inside diameter $D_3$, wherein $D_1<D_3\leqq D_2$;

a hollow conically shaped charge liner axially aligned and fitted within said warhead case, said charge liner having a closed apex and an open base opposite said closed apex, said charge liner further defining an inwardly facing surface and an outwardly facing surface;

explosive material filling said first section of said warhead case about said outwardly facing surface of said charge liner;

a retaining ring threadably engaging said inwardly facing threads of said third section for retaining said charge liner and said explosive material in said first section; and an end cap fitted to said first section, said end cap having an initiator coupler formed therein for housing a primer charge used to detonate said explosive material, said initiator coupler being in axial alignment with said charge liner.

2. An anti-armor warhead assembly as in claim 1 wherein said open base of said charge liner defines an annular lip extending radially outward from said charge liner to engage said second section of said warhead case.

* * * * *